March 20, 1928.
R. L. AUMACK
1,662,810
BRAKE DRUM MOUNT FOR MOTOR VEHICLES
Filed Aug. 13, 1927 2 Sheets-Sheet 1
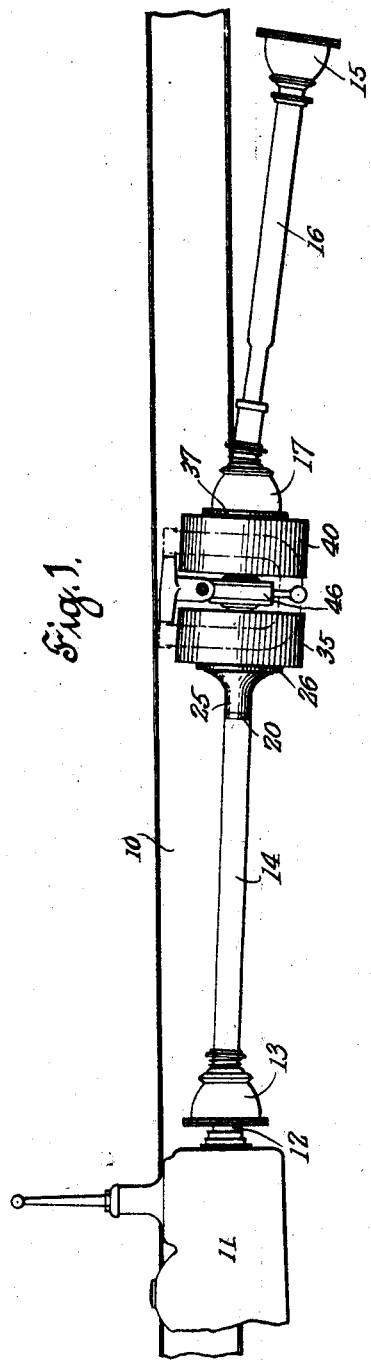
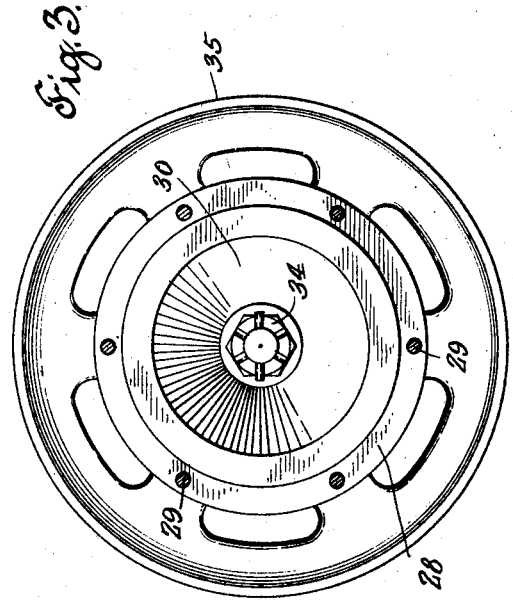
INVENTOR.
Raymond L. Aumack
BY
ATTORNEY March 20, 1928.
R. L. AUMACK
1,662,810
BRAKE DRUM MOUNT FOR MOTOR VEHICLES
Filed Aug. 13, 1927   2 Sheets-Sheet 2
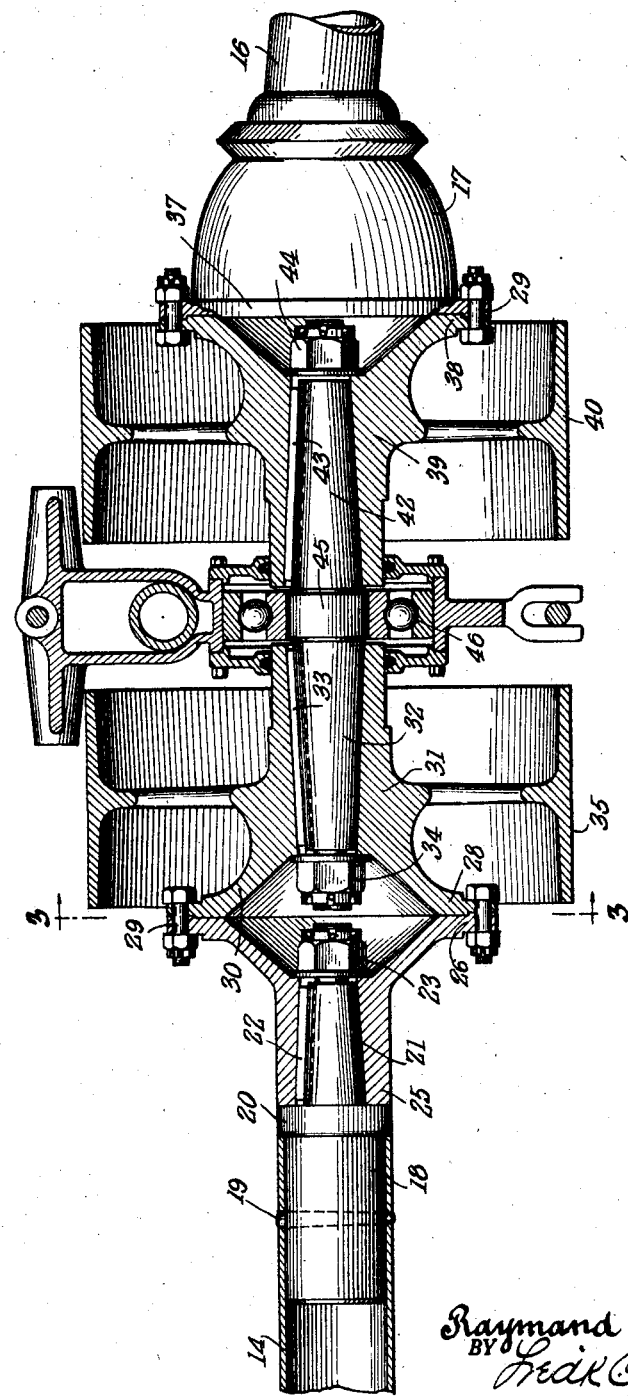
INVENTOR.
Raymand L. Aumack
BY
ATTORNEY Patented Mar. 20, 1928.

1,662,810

UNITED STATES PATENT OFFICE.

RAYMOND L. AUMACK, OF ROSELLE, NEW JERSEY.

BRAKE-DRUM MOUNT FOR MOTOR VEHICLES.

Application filed August 13, 1927. Serial No. 212,624.

This invention relates to brake mechanisms as applied to the propeller shaft of motor vehicles, and more particularly to the types used in connection with heavy trucks where considerable power is employed and in which it is desirable to apply a brake with full assurance that the same will become immediately operative.

In devices of this kind, it has heretofore been usual to secure one or more brake drums directly upon the propeller shaft, but it is found that ordinary securing means between the brake drums and the shaft become loose and fail due to the frequent torsional and lateral strains imposed, which looseness becomes rapidly accelerated by wear and continuous use until repairs are necessary.

It is therefore an object of the present invention to provide a propeller shaft arranged in three sections, respectively driving, driven and intermediate upon the latter of which is rigidly secured the hubs of the brake drums; also on this shaft may be rotatably mounted the brake shoe carrying mechanism used in connection with the drums.

A further feature is in the provision of direct operative connections between the proximate ends of the driving and driven shafts and the hubs of the brake drums, so that the torsional strain is taken directly by the drums rather than the shaft section on which they are mounted.

Another object is to provide an intermediate shaft section, tapered conically at both end portions on which the brake drum hubs are seated, the same being further held by keys set in the shaft and nuts to draw them firmly to their seats, producing a construction which is substantially integral in its operative effects.

Another purpose is to produce a brake drum mechanism arranged upon an intermediate shaft, readily removed as an entity from between the driving and driven sections of the shaft.

These and other like objects, which will become apparent as the description progresses, are accomplished by the novel construction and combination of parts hereinafter described and shown in the accompanying drawings, forming a material part of this specification, and in which:—

Figure 1 is a side elevational view showing a portion of a conventional chassis frame and propeller shaft as used in connection, together with an embodiment of the invention.

Figure 2 is an enlarged longitudinal sectional view taken through the couplings and brake drums as carried on an intermediate shaft.

Figure 3 is an end and sectional view of the device, taken on line 3—3 of Figure 2.

Referring more in detail to the drawings, the numeral 10 designates the chassis frame of a motor vehicle supporting, in the usual manner, a transmission gear case 11 at the forward end of the vehicle, from which extends the rear end of the terminal shaft 12 of the transmission mechanism, the same being engaged by a universal joint covered by a housing 13 in the customary manner.

Connected by the universal joint in the housing is the driving section 14 of the propeller shaft here shown as of tubular construction.

At the rear of the vehicle is another universal joint housing 15 to which connections are made with the rear axle in any preferred manner, and engaged therewith is the driven section 16 of the propeller shaft, the same terminating in another universal joint contained in the casing 17, all of the foregoing parts being of usual commercial type of construction.

The invention may be said to begin with a plug 18 welded or shrunk in the rear end of the driving section 14 and further held by a tapered pin 19 passing transversely through the plug and tubular shaft.

Extending rearwardly from the plug is a solid collar 20 having a tapered stem 21 provided with a key 22, its outer, smaller end being screw threaded to receive a castellated nut 23 and a washer.

On the tapered stem 21, held by the key 22, and nut 23, is a sleeve 25 having an expanded hollow conical portion terminating in an annular flange 26, recessed on its face to receive a corresponding flange 28 securely held thereagainst by means of a plurality of bolts 29.

The flange 28 is integral with a hollow cone 30, formed on the hub 31, which is conically bored and key seated to receive the conical tapered end portion 32 of an intermediate shaft, this hub being forced over a key 33 set in the shaft by a nut 34, screw threaded on the forward end of the shaft.

From the hub 31 extends a plurality of integral radial arms supporting a brake drum 35 having its outer edge slightly short of the plane of the flange 28, as seen in Figure 2.

In a similar manner a flange 37 on the universal joint casing 17 is connected with a flange 38 on the outer edge of a conical element integral with a hub 39 provided with spokes which carry the brake drum 40.

The hub 39 has a conical bore to seat upon the tapered conical portion of the opposite end 42 of the intermediate shaft, which, like the other end, is provided with a key 43 and nut 44 by which the hub 39 is drawn firmly upon its seat.

The proximate ends of the hubs 31 and 39 extend toward each other beyond the edges of the brake drums 35 and 40 and are machine finished to present annular surfaces.

Midway between the tapered portions of the intermediate shaft is a short cylindrical section 45 on which is mounted an anti-frictional bearing 46 supporting a brake shoe carrying mechanism of any approved type.

From the foregoing it will be seen that the brake drums 35 and 40 are held with extreme rigidity to the intermediate shaft section, forming in effect a unitary structure capable of being removed intact from between the adjacent ends of the propeller shaft upon disconnecting the bolts 29.

It will be further apparent that the brake drums are positively held to the ends of the intermediate shaft sections in such manner as to prevent relative movement, either rotary or longitudinal.

As changes of construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:—

1. In a motor vehicle, a longitudinal sectional propeller shaft, flanged elements on the proximate ends of the outer sections, two brake drums rigidly fixed on the intermediate section, and flanges on the hubs of said drums bolted to the flanges of said elements.

2. In a motor vehicle, a longitudinally disposed propeller shaft, said shaft having driving, intermediate and driven sections, flanges fixed on the proximate ends of said driving and driven sections, oppositely coned seats on said intermediate section, a brake drum having a hub fixed on each of said seats, and flanges extending outwardly from the hubs of said drums, said flanges adapted to engage between the first named flanges.

3. In a motor vehicle, a longitudinally disposed propeller shaft, said shaft having driving and driven sections, a plug fixed in the driving section, said plug having a tapered extension, a flange having a hub keyed to said tapered extension, means to hold the hub thereon, a flange on the proximate end of said driven section, an intermediate section having oppositely coned portions, a brake drum having a hub keyed to each coned portion, means to secure the hub thereon, and flanges on the outer ends of said hubs to engage the hubs of the adjacent shaft sections.

4. In a motor vehicle, a longitudinally disposed propeller shaft, said shaft having driving and driven sections, a plug fixed in the driving section, said plug having a tapered extension, a flange having a hub keyed to said tapered extension, means to hold the hub thereon, a flange on the proximate end of said driven section, an intermediate section having oppositely coned portions, and a straight cylindrical center, brake drums having hubs keyed and secured to the coned portion of said intermediate shaft, flanges on said hubs to engage between the first named flanges, and an anti-friction ring bearing on the cylindrical portion of the intermediate section.

5. In a motor vehicle having a propeller shaft composed of two or more sections, coupling flanges rigidly fixed on the proximate ends of adjacent sections, a pair of brake drums having hubs, coupling flanges on the outer ends of said hubs adapted to removably engage the first named flanges, and a support member intermediate the shaft sections on which said drums are rigidly mounted.

This specification signed and witnessed this eleventh day of August, 1927.

RAYMOND L. AUMACK.